2,947,660
PROCESS AND COMPOSITIONS FOR TREATING NEMATODES

Otto L. Hoffmann, Pittsburg, Kans., assignor to Spencer Chemical Company, a corporation of Missouri No Drawing. Filed Dec. 7, 1956, Ser. No. 626,833

10 Claims. (Cl. 167—22)

This invention relates to the contol of nematodes and compositions useful therefor. More particularly, this invention relates to the contorl of nematodes by the use of certain alpha, omega-dihaloalkanes and to novel compositions containing at least one such compound, or its equivalents, as the active ingredient.

Nematodes are non-segmented worms found in the soil, in plant life and in animal life, including the hookworm, pinworm, round worm, trichina, gapeworms, Guinea worm and whipworm. The term "nematodes" as used herein is intended to include all forms through which nematodes pass in a life cycle, such as eggs, larvae and adults.

Plant nematodes or eelworms range in length from less than one-sixty fourth of an inch to about one-eighth of an inch. Plant nematodes are found in all soils in which plants will grow, and consequently every major crop is a potential victim of this pest. The annual damage as either directly or indirectly incurred from nematodes may be as great as three billion dollars.

Since the first steps to control plant nematodes by a chemical treatment in 1881, employing carbon disulfide, there has not been a material introduced which was entirely satisfactory. Even the most promising compounds which have become commercially available provide inadequate control and are expensive, toxic to animals, and phytotoxic to many plants as well.

We have discovered that alpha, omega-dihaloalkanes of the formula

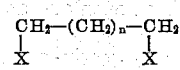

wherein X is chlorine or bromine and $n$ is an integer from 3 through 6 inclusive, but excluding 1,5-dichloropentane, are effective in the control of plant parasitic nematodes. (As used herein alpha refers to the first carbon and omega to the terminal carbon in the alkane chain.) Some typical useful compounds within this formula are 1,5-dibromopentane, 1,6-dibromohexane, 1,6-dichlorohexane, 1,7-dibromoheptane, 1,7-dichloroheptane, 1,8-dibromooctane, and 1,8-dichlorooctane. The bromo compounds are generally more active than the chloro compounds. Surprisingly, the alpha, omega-dihalo propane and butane compounds and 1,5-dichloropentane were found to be unsuitable as nematocides.

When used in the treatment of soils at the recommended nemtocidal rates the compounds found active are not phytotoxic. Moreover, they may be applied to either the affected soil or plant and at any stage of plant growth without damage to the plant. 1,2-dibromoethane, on the other hand, which is presently used as a nematocide, is very injurious to living plants. For this reason, it may only be used with complete safety if applied to the soil about one week prior to planting. During this period it is expected to sterilize the soil and thereafter volatize into the air.

Low mammalian toxicity, in which the $LD_{50}$ an albino mice (orally) is 1530 mg./kilogm., makes application of the compounds safe.

The following test procedures were employed in evaluating the alpha, omega-dihaloalkanes:

Contact test

Water suspensions of the test chemical are prepared in the concentration series of 500, 50, 5 and 0.5 p.p.m. Each concentration is placed in a separate stoppered test tube. Freshly hatched larvae are then added to each concentration. After 24 hours, and again after 5–7 days, the contents of each test tube are observed through a microscope. If a significant percentage kill is obtained, the dead nematodes are counted and the percentage kill is recorded as compared with a control containing no chemical.

Soil treatment (pot test)

Water suspensions of the test chemicals are prepared in concentrations corresponding to 100 lbs. and 10 lbs. per acre. Four inch clay pots are filled with a soil which is infested with the nematode. The chemical suspension is then applied to the soil and after one week tomato seedlings are placed in the pots. After 6–8 weeks, the plants are removed and observed for the presence of nematode damage.

Fumigation test

This method consists of placing the nematode larvae in sand and soil in contact with the compound being tested in sealed jars for 24 hours. The nematodes are then decanted and examined for viability. The results of the test represent the effect of both fumigation and contact.

The results of these tests which were performed on representative alpha, omega-dihaloalkanes are included below for comparison.

| Nematocide | Contact Test (Lowest effective conc., p.p.m.) | | Fumigation Test (Lowest effective conc., p.p.m.) | | | | Soil Treatment (Pot Test)[b] |
|---|---|---|---|---|---|---|---|
| | | | Sand | | Soil | | |
| | 24 hours | 5-7 days | 24 hours | 6 days | 24 hours, top/bottom | 6 days, top/bottom | |
| 1. 1,8-dibromooctane | 50[a] | 5[a] | 100[c] / 100[d] | 100[c] | NS/NS[c] | 100/NS[c] / 100/NS[d] | 100% control w/o injury at 100#/acre. 100% control @31#/A. exhibited when precaution was taken to *mix* this compound thoroughly with soil. |
| 2. 1,6-dibromohexane | 50[a] | 50[a] | 10[c] / 10[d] | 10[c] | 100/NS[c] / 100/NS[a] | 31.6/100[c] | |
| 3. 1,6-dichlorohexane | 500[a] | 50[a] | 100[d] | 100[d] | 100/NS[c] / 100/NS[a] | 31.6/100[c] | 90% control w/o injury @ 100#/A. |
| 4. 1,5-dibromopentane | 50[a] | 50[a] | 100[c] | 10[c] | 31.6/NS[c] | 31.6/31.6[c] | 100% control w/o injury @ 100#/A. NS. |
| 5. 1,5-dichloropentane | NS[b] (in Felsen dishes) | NS[b] | | | | | |
| 6. 1,4-dibromobutane | NS[a] | NS[a] | NS[c] | NS[c] | | | NS. |
| 7. 1,3-dibromopropane | NS[a] | 500[a] | | | | | |
| 8. control[e] | 500[a] / NS[b] | 500[b] | NS[c] / 100[d] | 100[c] / 100[d] | 100/NS[c] / 100/100[a] | 10.0/31.6[c] | 100% control @ 100#/Acre but injurious to living plants. NS @ 10#/Acre. |

[a] Ditylenchus species.
[b] Meloidogyne.
[c] Panagrellus.
[d] Rhabditus.
[e] 1,2-dibromoethane; a commercial nematocide.
NS = No significant control.

The optimum rate of application, as far as plant parasitic nematodes is concerned, will depend upon the type of plant as well as such factors as pH of the soil, soil condition and climatic conditions, and the particular type of nematode present. Excellent contol of the Meloidogyne species, without danger of phytotoxicity, is exhibited at a dosage of about 100 lbs. per acre.

The application of the active alpha, omega-dihaloalkanes to soils is readily achieved by the use of novel concentrates and compositions containing one such compound as the active ingredient. To achieve a suitable disperson on soils it is most convenient to employ compositions in which the compound is combined with an inert carrier or diluent. The carrier may be a polar solvent, in most of which the active compounds are soluble; it also may be a solvent which will not dissolve the compound, for suitable dispersions are also effective. Such compositions may be be sprayed on the soil. Solid carriers are usually not employed due to the volatility of the compounds.

Water is the preferred carrier because it is so widely available and inexpensive. The compounds are esssentially insoluble in water, however, and accordingly, to provide compositions of uniform concentration from which the active compounds will not settle out rapidly, a surface active agent is included in the compositions. The surface active agent may be ionic or non-ionic and may be a liquid or solid under ordinary conditions. Typical satisfactory surface active agents which may be used are alkali-metal higher alkylaryl sulfonates such as sodium dodecyl benzene sulfonate, fatty alcohol sulfates such as the sodium salts of the monoesters of sulfuric acid with n-aliphatic alcohols containing 8–18 carbon atoms, sodium salts of alkyl naphthalene sulfonic acids, long chain quaternary ammonium compounds, sodium salts of petroleum-derived alkylsulfonic acids, polyoxyethylene sorbitan mono-oleate and alkyl aryl polyether alcohol. An adjuvant liquid may also be included in such compositions. Such liquid may be either soluble or insoluble in water and may be any solvent such as an alcohol, benzene, toluene, kerosene, or hexane, which aids in solubilizing or dispersing an active alpha, omega-dihaloalkane in water.

Concentrated compositions containing the active alpha, omega-dihaloalkanes which may be subsequently diluted, as with water, to the desired concentration for application to soil are also provided. The advantages of such concentrates are that they are prepared by the manufacturer in a form such that the user need only mix them with a locally available carrier, preferably water, thereby keeping shipment costs to a minimum while providing a product which may be used with a minimum of equipment and effort. Such concentrates may contain about 50% or more of one or more active compounds and a carrier or diluent, which may be a liquid or suitable solid. Liquid carriers which either dissolve the active alpha, omega-dihaloalkanes such as diphenyl ether, or other liquids in which these compounds may be suspended may be used. A wetting or surface active agent is also generally included to facilitate subsequent dilution or dispersion in water. However, the wetting agent itself may comprise the carrier in such concentrates.

The following emulsifiable concentrate is particularly useful for high dilution rates:

30% (wt) 1,6-dichlorohexane
10% Triton X–151: blend of an alkylaryl polyether alcohol and organic sulfonate
10% Atlas CIPC emulsifier: a polyoxyethylene fatty acid ester
25% cyclohexanone
25% xylene Another emulsifiable concentrate may have the formula 92.3% (wt.) 1,6-dibromohexane
7.7% Agrimul GM—manufactured by Nopco Chemical Co.

Various changes and modifications of the invention can be made and, to the extent that such variations incorporate the spirit of this invention, they are intended to be included within the scope of the appended claims.

We claim:
1. A parasitic nematode control composition which comprises an alpha, omega-dihaloalkane of the group consisting of 1,5-dibromopentane and compounds of the formula

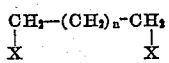

wherein X is a member of the group consisting of chlorine and bromine and n is an integer from 4 through 6, a surface active agent, and an inert pesticide carrier as an adjuvant therefor.

2. The composition of claim 1 in which the carrier is water and at least 50% by weight of the composition is the described alpha, omega-dihaloalkanes.

3. A wettable powder for parasitic nematode control comprising a suitable inert powdered solid carrier, an alpha, omega-dihaloalkane of the group consisting of 1,5 dibromopentane and compounds of the formula

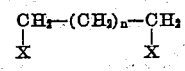

wherein X is a member of the group consisting of chlorine and bromine and n is an integer from 4 through 6, and a liquid surface active agent.

4. A parasitic nematode control concentrate comprising an alpha, omega-dihaloalkane of the group consisting of 1,5-dibromopentane and compounds of the formula

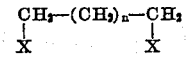

wherein X is a member of the group consisting of chlorine and bromine and n is an integer from 4 through 6, and a wetting agent.

5. The method of treating parasitic nematodes which comprises contacting the nematodes with a nematocidal amount of an alpha, omega-dihaloalkane of the group consisting of 1,5-dibromopentane and compounds of the formula

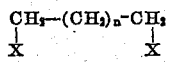

wherein X is a member of the group consisting of chlorine and bromine and n is an integer from 4 through 6.

6. The method of treating plant parasitic nematodes which comprises applying a nematocidal amount of an alpha, omega-dihaloalkane of the group consisting of 1,5-dibromopentane and compounds of the formula

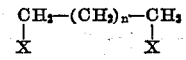

wherein X is a member of the group consisting of chlorine and bromine and n is in an integer from 4 through 6, to plants and soils infected with the nematodes.

7. The method of conditioning soils containing parasitic nematodes which comprises applying to the soil a nematocidal amount of from 10 to 100 pounds per acre of an alpha, omega-dihaloalkane of the group consisting of 1,5-dibromopentane and compounds of the formula

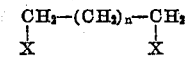

wherein X is a member of the group consisting of chlorine and bromine and n is an integer from 4 through 6.

8. A parasitic nematode control composition which comprises an alpha, omega-dihaloalkane of the group consisting of 1,5-dibromopentane and compounds of the formula

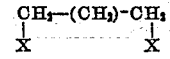

wherein X is a member of the group consisting of chlorine and bromine and n is an integer from 4 through 6, and an inert pesticide carrier as an adjuvant therefor, said composition being in the form of an aqueous emulsion.

9. The composition of claim 8 in which the composition is an aqueous dispersion.

10. A parasitic nematode control composition which comprises an alpha, omega-dihaloalkane of the group consisting of 1,5-dibromopentane and compounds of the formula

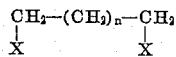

wherein X is a member of the group consisting of chlorine and bromine and $n$ is an integer from 4 through 6, a surface active agent, and an inert liquid pesticide carrier as an adjuvant therefor.

References Cited in the file of this patent

UNITED STATES PATENTS

| | | |
|---|---|---|
| 1,982,909 | Flint | Dec. 4, 1934 |
| 2,057,044 | Meisenburg | Oct. 13, 1936 |
| 2,377,446 | Payne | June 5, 1945 |
| 2,411,566 | Evans | Nov. 26, 1946 |
| 2,419,073 | Hammer | Apr. 15, 1947 |
| 2,435,204 | Davidson | Feb. 3, 1948 |
| 2,448,265 | Kagy | Aug. 31, 1948 |
| 2,473,984 | Bickerton | June 21, 1949 |
| 2,502,244 | Carter | Mar. 20, 1950 |
| 2,543,580 | Kay | Feb. 27, 1951 |
| 2,586,793 | Doty | Feb. 26, 1952 |
| 2,726,485 | Thomas | Dec. 13, 1955 |
| 2,730,547 | Dye | Jan. 10, 1956 |
| 2,743,209 | Jones | Apr. 24, 1956 |
| 2,757,117 | Birum | July 31, 1956 |
| 2,770,638 | Giolito | Nov. 13, 1956 |
| 2,779,680 | Wolf | Jan. 29, 1957 |
| 2,794,727 | Barrons | June 4, 1957 |
| 2,802,021 | Heininger | Aug. 6, 1957 |
| 2,802,818 | Wheeler | Aug. 13, 1957 |
| 2,802,831 | Wheeler | Aug. 13, 1957 |
| 2,809,983 | Heininger | Oct. 15, 1957 |

FOREIGN PATENTS

| | | |
|---|---|---|
| 124,387 | Australia | June 12, 1947 |

OTHER REFERENCES

Frear: Chemistry of Insecticides, Fungicides and Herbicides, 2nd, September 1948, pp. 280–287, 108–122.

King: U.S.D.A., Handbook No. 69, May 1954, p. 252.

Parnell: Br. Jour. Pharmacol., vol 7 (1952), pp. 510–533, pp. 510 and 514 relied upon.

Agricultural Chemicals, February 1956, p. 61.

UNITED STATES PATENT OFFICE
CERTIFICATION OF CORRECTION

Patent No. 2,947,660

August 2, 1960

Otto L. Hoffmann

It is hereby certified that error appears in the above numbered patent requiring correction and that the said Letters Patent should read as corrected below.

Column 1, line 21, before "nematodes" insert -- which --; column 2, line 15, for "an" read -- on --; column 4, line 71, for that portion of the formula reading "$-(CH_2)-$" read -- $-(CH_2)_n-$ --.

Signed and sealed this 2nd day of May 1961.

(SEAL)
Attest:

ERNEST W. SWIDER
Attesting Officer

DAVID L. LADD
Commissioner of Patents